June 27, 1939.  H. C. BUFFINGTON  2,163,662
IMPLEMENT MOUNTING FOR TRACTORS
Filed March 19, 1937  4 Sheets-Sheet 1
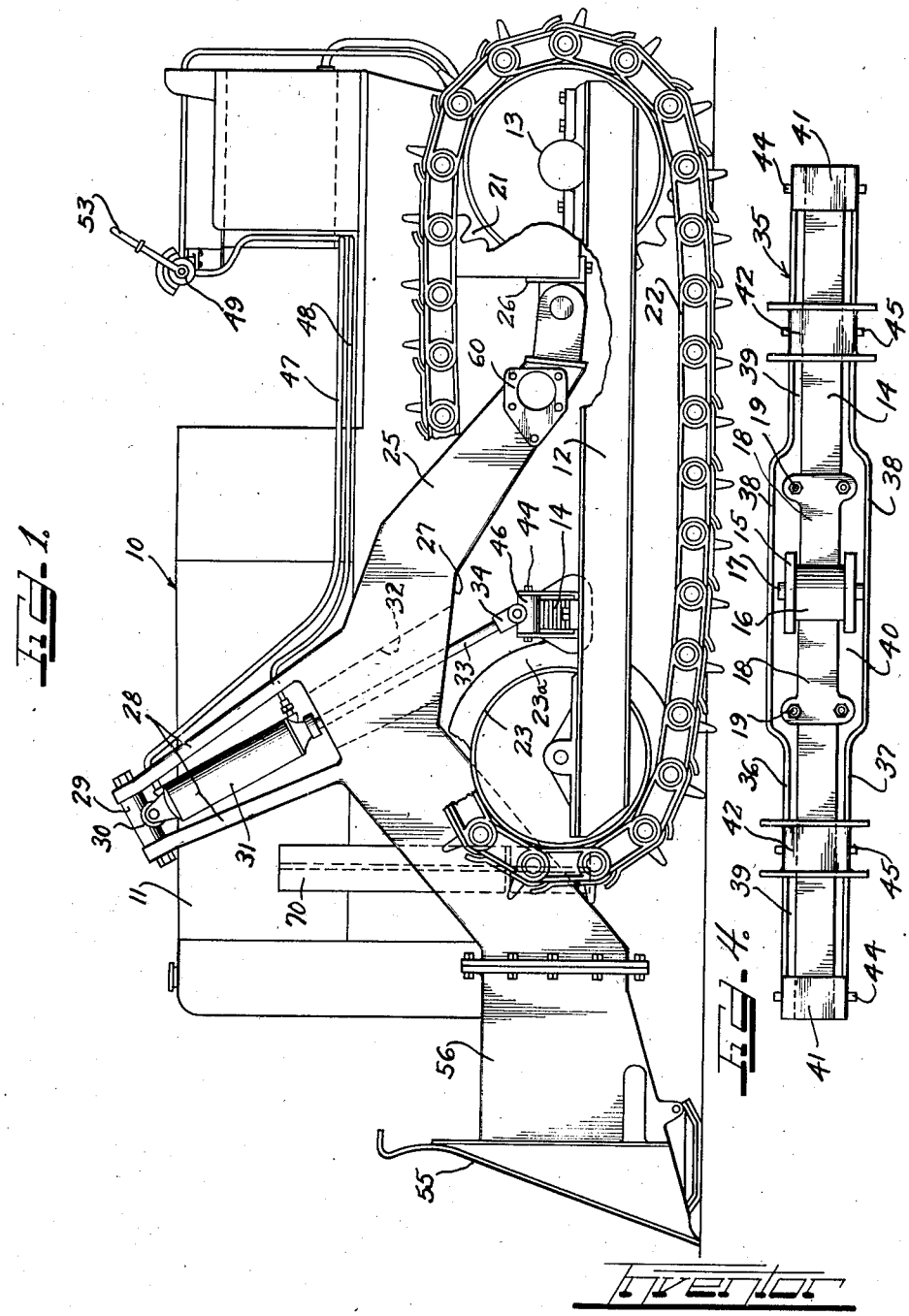
Inventor
HARRY C. BUFFINGTON.
by Charles H. Hill Attys.

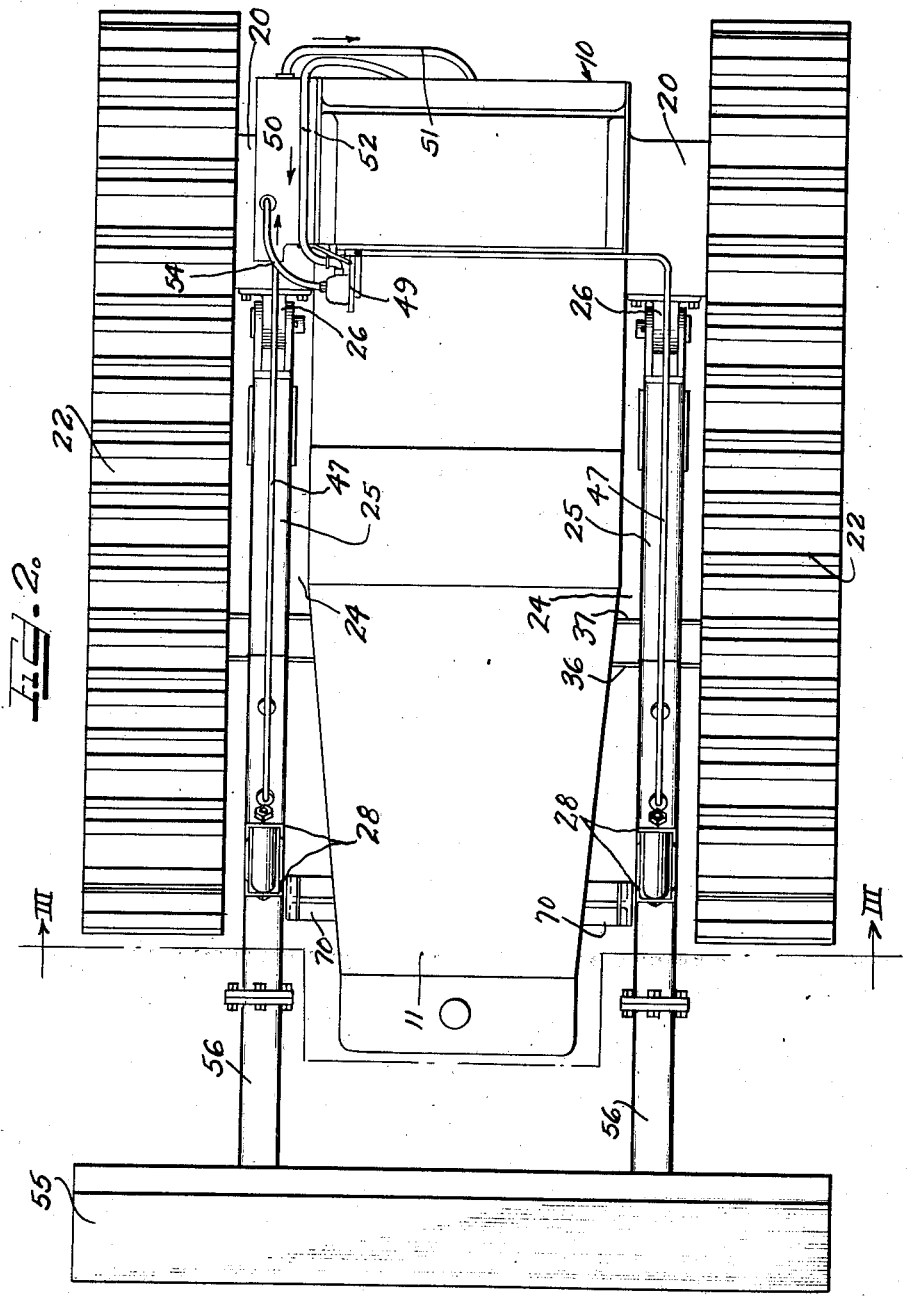

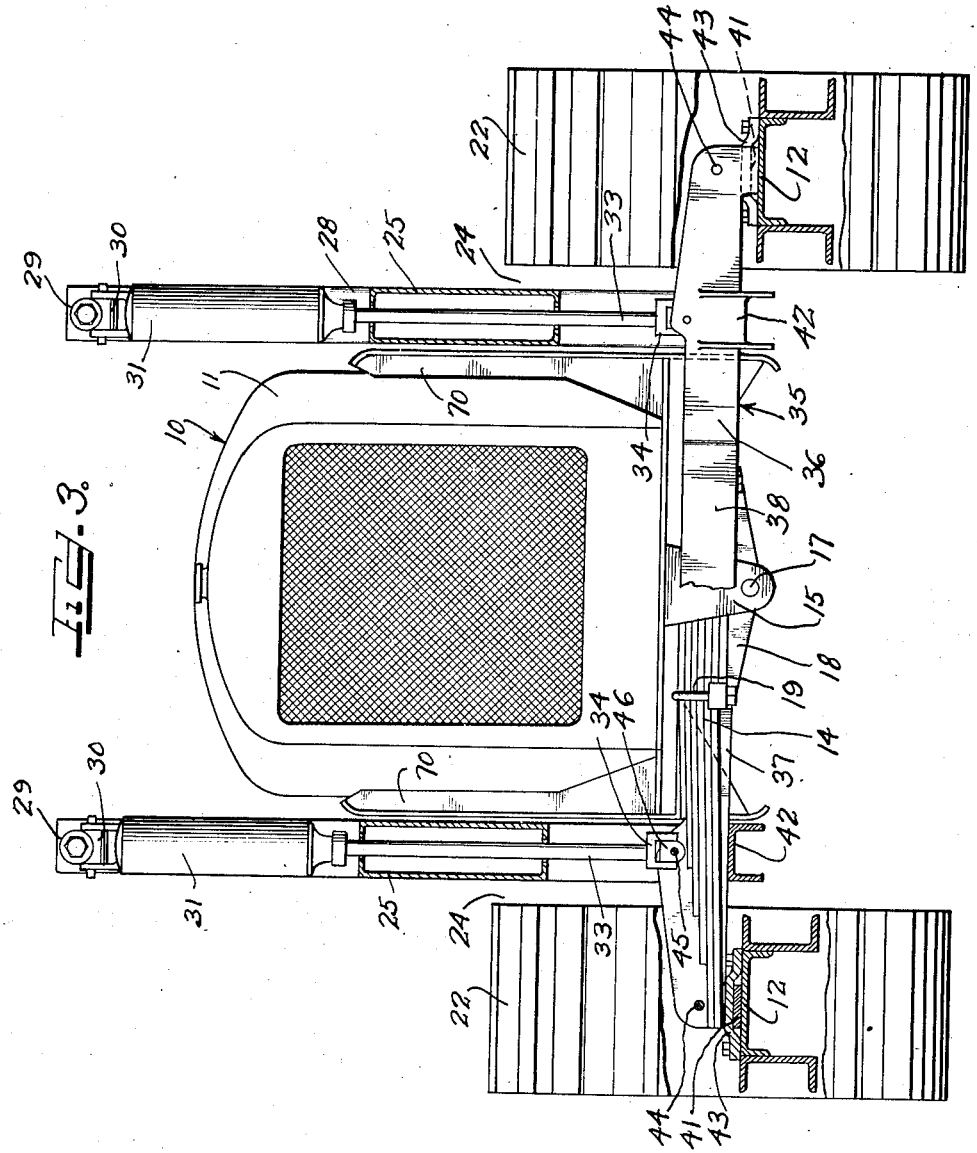

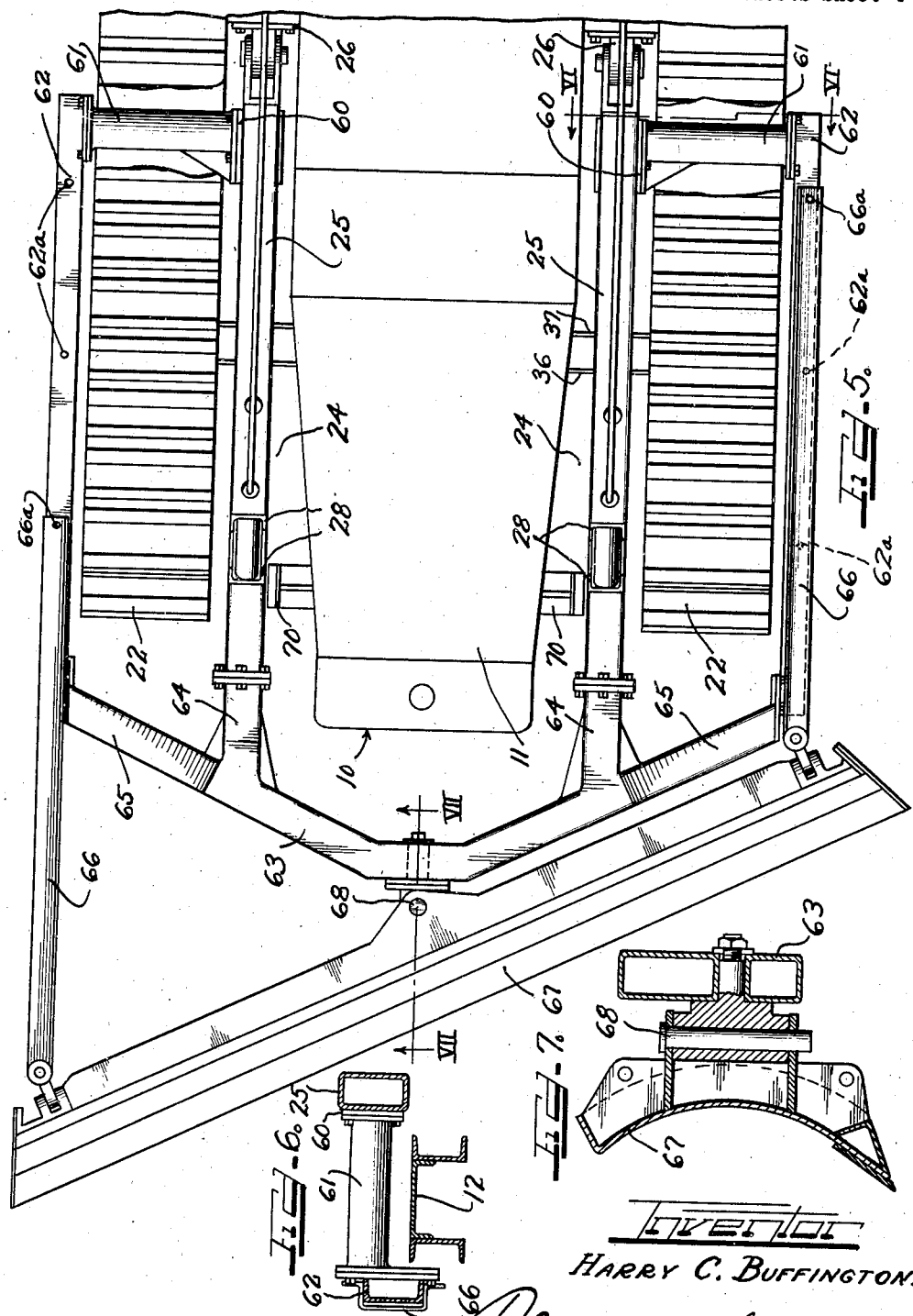

Patented June 27, 1939

2,163,662

UNITED STATES PATENT OFFICE 2,163,662

IMPLEMENT MOUNTING FOR TRACTORS

Harry C. Buffington, Springfield, Ill., assignor to Baker Manufacturing Co., Springfield, Ill., a corporation of Illinois Application March 19, 1937, Serial No. 131,802

14 Claims. (Cl. 37—144)

This invention relates to road machinery such as bulldozers, snow plows, scrapers, grade builders and the like.

More specifically, this invention is concerned with the mounting and operation of earth or snow moving implement blades on track laying tractors.

Heretofore the work blade or plow of tractor type bulldozers, snow plows and the like has been mounted on push beams carried by the tractor and extending forwardly of the tractor on the outside of the tracks thereof. However, since track laying tractors are turned by disengaging one track, it is desirable to have the tracks spaced apart as far as practical to obtain more power for turning. This wide spacing of the tracks obviously gives the driven track a longer force arm in swinging about the disengaged track and even though the driving power applied to the driven track is not increased the actual turning power of the tractor is increased because of this longer force arm.

Furthermore the tracks themselves should be made as wide as practical to increase the traction for the tractor.

In these desirable so-called wide gauge tractors, the push beams for implement blades, when mounted to extend on the outside of the tracks, are obviously spaced farther apart than on a narrow gauge tractor, thereby necessitating the use of longer implement blades which require more power to operate and add greatly to the weight carried by the tractor. Since the tracks themselves are widened in the wide gauge tractor a mounting of the push beams on the track frames, which are in the centers of the tracks, necessitates the use of longer and heavier connecting brackets so that the push beams can clear the tracks.

In the wide gauge tractors the axle housing, springs and the like which connect the track frames to the motor frame or tractor body are lengthened to accommodate the wider gauge or greater center-to-center distance between the tracks. Spaces are thus provided between the motor frame or body frame of the tractor and the tracks.

According to this invention the spaces between the motor frame and tracks of wide gauge tractors are utilized for receiving the push beams for implement blades. These push beams are pivoted on the rear axle housing of the tractor and are operated by fluid pressure jacks acting against a transverse equalizer bar mounted at its ends on the transverse centers of the track frame. The push beams are bowed upwardly to allow clearance above the equalizer bar so that they can be lowered to force the implement blade into the ground below the tractor level if desired.

As a result of such mounting of the push beams, the implement blade carried thereby can be much shorter in comparison to the long implement blades required on wide gauge tractors when carried by push beams mounted on the outside of the tracks. The implement blade is thus made considerably lighter and excessive strain and wear on the tractor is avoided. At the same time the increased turning and traction power for the tractor is fully utilized.

Implement blades requiring an outside frame such as grade builders that have adjustable struts for angling the implement blade and snow plows having a wing extension are conveniently provided with such necessary outside frames in the push beam mounting arrangement of this invention by securing extension members to the rear parts of the push beams for extending through the tracks to receive the ends of the struts or other outside frames. Nevertheless the inside mounting of the push beams is maintained.

It is then an object of this invention to provide an implement blade mounting structure for wide gauge tractors that does not necessitate a lengthening of the implement blade.

A further object of this invention is to dispense with outside push beams in bulldozers, snow plows, grade builders, scrapers and the like machinery driven by tractors of the track laying type.

Another object of this invention is to provide an equalizer bar mounting for intercommunicating fluid pressure implement blade operating means permitting movement of the track frames in going over uneven ground without affecting the position of the implement blade.

Another object of this invention is to provide, in wide gauge track laying tractors, a transverse bar supported at its ends on the transverse centers of the track frames for hydraulic connection with the push beams of implement blade mountings.

A further object of this invention is the provision of extension members adapted to be secured to push beams mounted between the motor frame and the track frames of wide gauge tractors for extending outwardly through the tracks to receive outside frames.

Other and further objects of this invention will become apparent to those skilled in the art from the following detailed description of the annexed sheets of drawings which disclose a preferred embodiment of the invention.

On the drawings:

Figure 1 is a side elevational view of a wide gauge tractor of the track laying type having a bulldozer blade mounting thereon according to this invention, with part of the track broken away to more clearly show the mounting.

Figure 2 is a top plan view of the machine shown in Figure 1.

Figure 3 is a cross sectional view with parts in elevation, taken along the line III—III of Figure 2 and with other parts broken away and shown in cross section.

Figure 4 is a bottom plan view of the equalizer bar and the transverse tractor spring.

Figure 5 is a fragmentary top plan view of a grade builder mounting according to this invention on a wide gauge track laying tractor with parts of the tracks broken away.

Figure 6 is a vertical cross sectional view, with parts in elevation, taken along the line VI—VI of Figure 5.

Figure 7 is a vertical cross sectional view, with parts shown in elevation, taken along the line VII—VII of Figure 5.

As shown on the drawings:

In Figures 1, 2, 3 and 5 the reference numeral 10 designates generally a wide gauge track laying tractor. The tractor 10 comprises a body portion or motor frame 11 and track frames 12 extending longitudinally on each side of the body portion 11 in spaced relation therefrom. The track frames 12 are pivotally supported adjacent their rear ends on the rear axle 13 of the tractor 10. The forward ends of the track frames 12 are connected to a transverse spring 14. The tractor body or motor frame 10 is mounted on the central portion of the spring by means of a yoke member 15 bolted to the body portion or motor frame 11 and extending downwardly therefrom on each side of the center of the spring as shown in Figures 3 and 4. A bushing member or bearing member 16 is mounted under the spring 14 between the arms of the yoke member 15 and is secured to the yoke member by means of a pin 17 as best shown in Figure 4. The bearing member 16 has arms 18 extending laterally from each side on the top thereof. The arms 18 are secured at the ends thereof to the spring 14 by means of U-shaped straps 19.

An axle housing 20 encasing the axle 13 of the tractor has the ends thereof extending from each side of the motor frame or tractor body 11 and supports or partially supports sprocket gears 21 driven by the axle 13. The sprocket gears 21 are in driving engagement with crawler type tracks 22 surrounding the track frames 12. Idler wheels 23 are rotatably supported at the forward ends of the track frames 12 and support the forward ends of the tracks 22. The idler wheels 23 have flanges 23a for guiding the tracks 22.

In the wide gauge tractor structures described above there are provided spaces 24 between the tractor body or motor frame 11 and the tracks 22. These spaces are continuous except for the axle housing 20 and the transverse spring 14 which extend therethrough.

According to this invention, these spaces 24 are utilized for receiving the push beams 25. The push beams 25 are pivoted at their rear ends on brackets 26 bolted directly on the rear axle housing 20. The push beams 25 are preferably bowed upwardly in the central portions thereof as shown at 27 (Fig. 1) so as to be disposed in spaced relation above the spring 14.

Spaced opposed arms 28 extend upwardly from the tops of the bowed portions 27 of the push beams 25 and carry bearing members 29 at the top ends thereof extending therebetween in rotatable relation thereto. The bearings 29 have boss portions 30 at the centers thereof. Cylinders 31 of fluid pressure jacks are disposed between the arms 28 and are pivoted at their top ends to the boss members 30 of the bearings 29. Wide openings 32 are formed through the push beams 25 as best shown in Figure 1 for receiving therethrough piston rods 33 extending from the cylinders 31. Yokes 34 are secured to the ends of the piston rods 33.

An equalizer bar designated generally by the reference numeral 35 in Figures 3 and 4 is mounted transversely between the track frames 12 near the forward ends thereof on the transverse centers of the track frames. The equalizer bar 35 can be conveniently fitted around the transverse spring 14 of the tractor and for this purpose can be composed of two spaced opposed side walls 36 and 37 bowed outwardly at the mid-portions thereof as at 38 to define spaces 39 in which the spring may be placed and an enlarged space 40 for receiving the spring mounting means. The ends of the walls 36 and 37 are joined by connecting bottom portions 41 which extend below the bottom edges of the walls. Reinforcing connecting portions 42 also join the walls 36 and 37 at points spaced from the connecting members 41. The reinforcing connecting portions 42 are disposed in the spaces 24 between the motor frame 11 and the track frames. The portions 42 and the portions 41 can be formed integral with the side walls 36 and 37.

As best shown in Figure 3 the portions 41 of the equalizer bar 35 are mounted on top of the track frames 12 at the transverse centers of these frames. Strap members 43 have offset portions disposed over the connecting portions 41 and have the ends thereof securely bolted to the track frames 12 to rigidly clamp the equalizer bar 35 to the track frames. The ends of the main spring leaves of the spring 14 are disposed on top of the straps 43 and are held thereon by pins 44 mounted in the side walls 36 and 37 of the equalizer bar.

Pins 45 extend through the side walls 36 and 37 above the reinforced portions 42 for receiving therearound bearings or bushings 46 disposed between the side walls 36 and 37. As best shown in Figure 3 these bearings 46 are swivelly connected to the yokes 34 on the ends of the piston rods 33.

The cylinders 31 are thus universally suspended from the arms 28 of the push beams 25 and the piston rods 33 of the cylinders 31 are universally connected to the equalizer bar 35 which is mounted at its ends on the transverse centers of the track frames. An operation of the piston rods 33 into and out of the cylinders 31 will thus cause a raising and lowering of the push beams 25 about their pivot points on the axle housing 20.

As is customary in fluid pressure jacks, the piston rods are connected to pistons disposed in the cylinders 31. Oil is supplied to the cylinders on either side of the pistons therein through tubes 47 and 48 communicating respectively with the top and bottom ends of the cylinders 31 and with a control valve 49. Oil for operating the pistons is stored in a tank 50 mounted adjacent the driver's seat of the tractor. A pump (not shown) driven by the tractor removes oil through a pipe 51 from the tank 50 for supplying the oil under pressure through a pipe 52 to the valve 49. The valve 49 is operated by a control handle 53 for directing the oil into either the tubes 47 or the tubes 48 depending on whether or not it is desired to force the piston rods 33 out of the cylinders 31 for raising the push beams or to force the piston rods 33 into the cylinders 31 for lowering the push beams. The tubes 47 and 48 supply both cylinders 31 and these cylinders are therefore in fluid communication with each other. Oil is returned from the cylinders through the valve 49 and through a pipe 54 back to the oil tank 50.

The fluid pressure operation of the hydraulic jacks is more fully described and illustrated in my U. S. Patent No. 2,044,933 entitled: "Scraper or grader" granted June 23, 1936.

In Figures 1 and 2 a bulldozer blade or mold board 55 has rearwardly extending arms 56 thereof bolted to the forward ends of the push beams 25. This mounting provides a complete bulldozer structure.

When it is desired to use the implement blade mounting of this invention on a mold board or implement blade requiring angular adjustment with respect to the tractor the push beams of this invention are adapted to receive extension members for supporting the adjusting struts as shown in Figure 5.

The push beams 25 have bracket receiving flanges 60 formed thereon near their rear ends. Extension members 61 are bolted to the flanges 60 and extend through the tracks 22. Strut guides 62 are bolted to the outer faces of the extension members 61 and extend forwardly from these members.

A yoke member 63 has arms 64 thereof bolted to the forward ends of the push beams 25. The yoke member 63 also has wing portions 65 extending outwardly from the arms 64. The forward ends of the strut guides 62 are bolted to the ends of the wings 65 of the yoke member 63.

Struts 66 are slidable on the strut guides 62 and are connected at their forward ends to the end portions of a grade builder blade or mold board 67 which is pivotally connected as at 68 to the center of the yoke member 63.

Angular adjustment of the grade builder mold board 67 relative to the tractor 10 is readily made by sliding the struts 66 on their guides 62 until the mold board 67 is disposed at the proper angle. The struts 66 are then locked against longitudinal movement on the guides 62 by means of pins (not shown) extending through holes 66a in the struts and selected holes 62a in the strut guides or by means of any other clamping devices. A plurality of holes 62a are provided in spaced relation on the strut guides to permit locking of the struts in various positions.

Rubbing plates or guides 70 for the push beams are mounted on each side of the tractor body near the front end of the tractor to prevent the push beams from contacting the tractor body.

Since the push beams are pivotally connected on the axle housing of the tractor and since the hydraulic jacks act against an equalizer bar supported on the transverse centers of the track frames, the weight of the implement mounting and implement blade is carried directly on the track frames.

Since the hydraulic cylinders are in intercommunicating fluid pressure relation as described above, the track frames may move independently of each other in going over uneven ground without affecting the position of the implement blade because, as one track frame is raised, the piston on the raised side will tend to move upwardly in the cylinder thereby forcing oil above the piston into the other cylinder above the piston in that cylinder. This will force the piston in this opposite cylinder downwardly, thereby forcing oil out of the lower end of the cylinder into the lower end of the other cylinder. It is thus obvious that an equilibrium is maintained and the track frames may move independent of each other without changing the position of the push beams to tilt the implement blade.

It should be understood that the equalizer bar 35 need not be disposed around the transverse spring 14 but can be separately mounted on the track frames in spaced relation from the spring.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In combination, a tractor having a motor frame, track frames longitudinally thereof in spaced relation therefrom and a rear axle housing extending between the motor frame and the track frames, push beams disposed between the motor frame and track frames, an implement mounted on said push beams, means pivotally connecting the push beams with the axle housing, a support mounted on the track frames and extending transversely across the tractor, and means acting against said support for raising and lowering the push beams relative to the tractor.

2. In combination, a tractor having a body frame, track frames on each side of said body frame, tractor belts disposed around the track frames in spaced relation from the body frame, push beams extending longitudinally of the tractor in the spaces between the tracks and body frame, an implement blade carried by the push beams, means pivotally connecting the push beams to the tractor, a support extending transversely across the tractor and mounted at its ends on the track frames, and means operatively connecting the support with the push beams for swinging the push beams about their pivots.

3. In combination, a tractor having a body frame, track frames extending longitudinally on each side of the body frame in spaced relation therefrom, an axle housing extending between the body frame and track frames, push beams disposed between the track frames and body frame, an implement blade carried by the push beams, means pivotally connecting the push beams with the axle housing, a bar extending transversely of the tractor under the body frame and mounted at its ends on the track frame, fluid pressure cylinders suspended from said push beams, piston rods operative in said cylinders, means connecting the piston rods with the transverse bar and means for supplying fluid under pressure to the cylinders for operating the piston rods to raise and lower the push beams relative to the tractor.

4. In combination, a tractor having a main frame, track frames on each side of said main frame in spaced longitudinal relation therefrom, an axle housing extending between the track frames and main frame, push beams disposed between the track frames and main frame, an implement blade carried by the push beams, means pivotally connecting the push beams to the axle housing, said push beams being bowed upwardly at the mid-portions thereof, a support extending transversely of the tractor under the body frame and beneath the bowed portions of the push beams, means connecting the ends of the support on the transverse centers of the track frames, and fluid pressure means operatively connecting the push beams with the support whereby the push beams are adapted to be swung about their pivot points.

5. A push beam for tractor operated road implements comprising a beam member bowed upwardly at the mid-portion thereof, arms extending upwardly from the mid-portion of said beam member in spaced opposed relation, means formed at one end of said beam for pivotal connection to a tractor and means formed at the other end of said beam for receiving a road implement.

6. A push beam for tractor operated road implements comprising a beam member having a vertically offset central portion, arms extending upwardly from said offset central portion in spaced opposed relation, said beam having an opening therethrough in alignment with the space between said arms, means at one end of said beam for pivotal connection to a tractor, and means at the other end of said beam for receiving a road implement.

7. In combination a tractor having a motor frame, track frames longitudinally of the motor frame in spaced relation therefrom, an axle housing extending between the track frames and motor frame, a support extending transversely of the tractor under the motor frame, means for mounting the ends of said support on the transverse centers of the track frames, push beams disposed between the track frames and motor frame having vertically offset center portions above the support, an implement blade carried by the push beams, means pivotally connecting the ends of the push beams with the axle housing, fluid pressure cylinders suspended from the push beams above the offset portions thereof, piston rods operative in said cylinders extending through the push beams and means connecting the ends of the piston rods with the support whereby the push beams can be swung about their pivot points with the weights thereof borne on the track frames.

8. In a track laying tractor having a motor frame, track frames on each side of the motor frame longitudinally thereof in spaced relation therefrom, a transverse spring extending under the motor frame and supported at its end on the track frames, a support member having side walls on each side of said spring, end portions connecting the bottoms of the side walls, means for securing said end portions on the transverse centers of the track frames, push beams disposed between the main frame and the track frames pivotally connected at their ends to the axle housing and having vertically offset portions disposed over the side walls of the supporting member, hydraulic cylinders suspended from said push beams, piston rods operative in said cylinders and extending therefrom and universal means connecting the ends of the piston rods with the supporting member intermediate the ends thereof whereby the push beams can be swung about their pivot points by action of the piston rods against the supporting member and the tractor spring can operate without interference from said member.

9. In combination, a tractor having a motor frame, track frames longitudinally thereof in spaced relation therefrom, a rear axle housing extending between the track frames and the motor frame, push beams disposed between the track frames and the motor frame, an implement blade mounted on the front ends of the push beams; means pivotally connecting the rear ends of the push beams with the axle housing, a support extending transversely under the motor frame and mounted at its ends on the transverse centers of the track frames, fluid pressure cylinders suspended from the push beams, piston rods operative into and out of said cylinders, means connecting the ends of the piston rods with the transverse support, tubes interconnecting the upper ends of the cylinders, additional tubes interconnecting the lower ends of the cylinders, and means for selectively delivering fluid under pressure to said tubes whereby the cylinders are in intercommunicating relation and the track frames may move freely in going over uneven ground without affecting the position of the push beams because of the fluid communication between the cylinders.

10. In combination, a tractor having a motor frame, track frames longitudinally thereof in spaced relation therefrom, an axle housing extending between the track frames and the motor frame, push beams disposed between the motor frame and track frames, means pivotally connecting the ends of the push beams on the axle housing, extension members mounted on the push beams near the pivotal axes thereof, said extension members terminating beyond the track frames, a yoke member connecting the front ends of the push beams, arms on said yoke member extending beyond the track frames, guide members secured to said arm members and to said extension members, a mold board pivoted to the yoke member at the center thereof, struts linked to the ends of the mold board and extending rearwardly thereof in slidable relation on said guides and means for raising and lowering said push beams for operation of said mold board.

11. In combination, a tractor having a body frame, track frames longitudinally of the body frame in spaced relation therefrom, an axle housing extending between the body frame and track frames, tractor belts disposed around the track frames, push beams disposed between the tractor belts and body frame, means pivotally connecting the ends of the push beams on the axle housing, extension members secured to the push beams near the pivotal axes thereof and extending laterally therefrom to the outsides of the tractor belts within the loops of said belts, means for securing an implement on the forward ends of the push beams, and means for supporting adjusting devices for said implement on said extension members.

12. A grade builder comprising a tractor having a body frame, track frames longitudinally of said body frame in spaced relation therefrom, an axle housing extending between the track frames and body frame, a supporting member extending transversely under the body frame, means for mounting the ends of said member on the transverse centers of the track frame, tractor belts looped around the track frames, push beams disposed between the tractor belts and body frame, means pivotally connecting the ends of the push beams on the axle housing, extension members bolted to the push beams near the pivotal axis thereof extending through the loops of the tractor belts to the outsides of the belts, a yoke member secured to the forward ends of the push beams, side arms on said yoke member extending beyond the tractor belts, strut guides bolted to the extension members and to the side arms of the yoke member, a mold board pivotally connected at its center to said yoke member, struts pivoted to the ends of the mold board in slidable relation on said strut guides, hydraulic cylinders suspended from the push beams, piston rods extending from said cylinders and means for universally connecting the ends of the piston rods with the transverse support whereby the weight of the mold board and mounting mechanism is borne on the track frames.

13. In combination, a tractor having a body frame, track frames longitudinally of said body frame in spaced relation therefrom, a support member for the body frame mounted at its ends on the track frames, push beams extending longitudinally of the tractor in the spaces between the track frames and the motor frame, said push beams being pivoted at their rear ends to the tractor, an implement device carried by the front ends of the push beams, said push beams having vertically offset central portions disposed above the support member so as to provide a clearance between the support member and the push beams when the latter are moved about their pivotal axes, spaced opposed arms extending upwardly from said vertically offset central portions of the push beams, said push beams having openings therethrough in alignment with the spaces between said arms, and push beam actuating devices suspended between said arms and extending through said openings in the push beams for acting against said support member to raise and lower the push beams relative to the tractor.

14. In combination, a tractor having a body frame, track frames extending longitudinally on each side of the body frame in spaced relation therefrom, an axle housing extending between the body frame and the track frames, push beams disposed between the track frames and body frame, an implement blade carried by the push beams, means pivotally connecting the push beams with the axle housing, said push beams having integral upwardly bowed portions intermediate the ends thereof for allowing the push beams to be moved downwardly to lower the implement below the bottom of the tractor and extension member receiving means on said push beams near the rear ends thereof adapted to receive extension members extending outwardly beyond the track frames to form supports for implement blade strut members.

HARRY C. BUFFINGTON.